United States Patent [19]

Tolman et al.

[11] Patent Number: 4,646,234
[45] Date of Patent: Feb. 24, 1987

[54] ANTI-PIRACY SYSTEM USING SEPARATE STORAGE AND ALTERNATE EXECUTION OF SELECTED PROPRIETARY AND PUBLIC PORTIONS OF COMPUTER PROGRAMS

[75] Inventors: J. Leonard Tolman, Provo; Joseph J. Ekstrom, Lindon, both of Utah

[73] Assignee: Brigham Young University, Provo, Utah

[21] Appl. No.: 584,713

[22] Filed: Feb. 29, 1984

[51] Int. Cl.$^4$ .......................... G06F 1/00; G06F 5/00; H04L 9/00
[52] U.S. Cl. .......................................... 364/200; 380/4
[58] Field of Search ............... 364/200, 900; 178/22.08, 22.09; 360/15

[56] References Cited

U.S. PATENT DOCUMENTS

| | | | |
|---|---|---|---|
| 4,246,638 | 1/1981 | Thomas | 364/200 |
| 4,446,519 | 5/1984 | Thomas | 364/300 |
| 4,458,315 | 7/1984 | Uchenick | 364/200 |
| 4,471,163 | 9/1984 | Donald et al. | 178/22.08 |
| 4,513,174 | 4/1985 | Herman | 178/22.08 |
| 4,525,599 | 6/1985 | Curran | 178/22.08 |
| 4,550,350 | 10/1985 | Billings | 360/15 |
| 4,558,176 | 12/1985 | Arnold | 178/22.08 |
| 4,573,119 | 2/1986 | Westheimer | 364/200 |
| 4,583,196 | 4/1986 | Koo | 364/900 |
| 4,584,641 | 4/1986 | Guglielmino | 364/200 |
| 4,584,665 | 4/1986 | Vrielink | 364/900 |
| 4,590,557 | 5/1986 | Lillie | 364/200 |
| 4,593,353 | 6/1986 | Pickholtz | 364/200 |

Primary Examiner—Archie E. Williams, Jr.
Attorney, Agent, or Firm—Workman, Nydegger & Jensen

[57] ABSTRACT

A system for computer software protection includes a random access memory (RAM) device and one or more read-only memory (ROM) devices. The RAM and ROMs are connected in parallel to a data transfer bus, and to an address bus. Selected proprietary portions of a program are pre-stored in the ROMs prior to distribution to system users, and the remaining portions of the program are stored on an external storage medium such as a diskette which is made available for access and use by system users. When using the program, the portion of the program stored on the external storage medium is loaded into the RAM. In executing the program, the system commences executing, in turn, each program instruction contained in the RAM until it is instructed to transfer to one of the ROMs for execution of the proprietary portions of the program stored in the ROMs. If a system user makes an unauthorized copy of the portion of the program stored on the external storage medium, since the proprietary portions of the program are stored in the ROMs, the unauthorized copy will be incomplete and will not be able to run without the proprietary portions of the program which are maintained in the ROMs.

10 Claims, 3 Drawing Figures

ANTI-PIRACY SYSTEM USING SEPARATE STORAGE AND ALTERNATE EXECUTION OF SELECTED PROPRIETARY AND PUBLIC PORTIONS OF COMPUTER PROGRAMS

BACKGROUND

1. The Field of the Invention

This invention relates to computer software protection systems and methods and, more particularly, to a novel system and method for preventing the unauthorized duplication and use of computer software.

2. The Prior Art

During recent years, the number of computers in use throughout the world has grown dramatically. For example, an increasing number of businesses, even small to medium size businesses, are automating various portions of their operations, such as, for example, their accounting and inventory management operations. In addition, many families and individuals are now using various types of home computers for a wide variety of purposes, including education, financial management, and entertainment.

As a result of this significant and continuing increase in computer usage, there has been a corresponding increase in the need for computer software for various applications. As used herein, computer software includes operating systems, application programs, or any combination of these which are in machine-readable form and which are required to enable a desired operation of a computer system. While computer software was, perhaps, once thought to have only a secondary position in the marketplace relative to computer hardware, computer software development and distribution has now become a large, profitable business in and of itself. Thus, it is not surprising that thousands of computer software development and/or distribution firms are now in existence and are actively developing and/or marketing software packages for use on various types of computer systems. As a result, even the unsophisticated computer user is now able to perform relatively complex tasks on a computer by using one of the many software packages which are commercially available.

When developing computer software, a developer will typically have a relatively large initial investment of time and other resources. For example, a software developer must first identify and define the requirements which must be met by the particular software to be developed and must then try to integrate all of these requirements into a workable software package. This generally entails preparing numerous flow charts and other materials which define how the software system will operate in response to various inputs and outputs. Once the software package is thus defined, the software is then written in some form, typically in one of the standard computer languages, such as BASIC, FORTRAN or COBOL. Finally, the software is coded in machine-readable form and stored on some type of storage medium, such as, for example, on magnetic tapes or diskettes. The computer software is then ready to be loaded into and used on the intended computer system. Significantly, the entire development process can take several months to complete, depending upon the complexity of the software package being developed.

Once a software package is fully developed as set forth above, the software developer will then usually license or otherwise distribute to computer users copies of the software on some storage media (such as, on magnetic tapes or diskettes). If the software package has been developed for a single, specific computer user, the software developer may be able to recover all of the costs of software development from such single user. More commonly, however, the software developer hopes to be able to market the software package to numerous computer users and to have each of such users bear only a portion of the development costs. Advantageously, such a marketing of the software package helps make the software less expensive such that it may be purchased by a larger number of users; and such marketing may also increase the profits which are ultimately obtained by the software developer.

Unfortunately, however, after a copy of a software package has been distributed to a computer user, such user sometimes makes additional copies the software and distributes them to others for use on other computer systems. This is typically done by copying the software from the storage medium provided by the software developer onto a second, similar storage medium. Thus, for example, if the software developer provided the software to a user on a magnetic diskette, such user might copy of the software onto a second magnetic diskette. This second diskette could then be used by others both to load the software into and to run the software on other computer systems.

Occasionally, such additional copies of the software package are then actually sold by a competing software distributor who, of course, keeps the profits from such sales. Such copies of the software may also be shared or distributed to others more informally through computer clubs and/or various software libraries. Importantly, such copying and distribution of the software package may significantly decrease the market share available to the original software developer. As a result, the software developer may not be able to make any profit on the software package, while others are able to distribute the software package at a very low price and make a relatively large profit. Even more unfortunately, the software developer may not even be able to completely recover its software development costs.

Although various types of legal protection are available to prevent the unauthorized copying, distribution, and use of computer software, it is often quite difficult to even find out that the computer software is being copies. This is particularly the case when the copies of the software are not being sold on the open market but are, rather, being distributed or shared informally among many computer users. As a result of this difficulty, therefore, various systems and methods for technologically protecting computer software have been developed and are currently being used in the software industry.

One of the most common types of prior art software protection methods consists of writing the software such that it will not permit copies to be made unless a certain "key" is provided. Such a method may comprise requiring that a password or code be given by the user before the software can be copied or, alternatively, permitting the software to be copied only on a particular machine which is in the possession of an authorized individual. Hence, if an unauthorized individual should try to make a copy of software which is thus protected, the computer software would simply fail to execute the copy command.

An alternate form of the above-described type of software protection method additionally comprises providing that the software will disassemble or scramble itself if an unauthorized copy is attempted to be made. Thus, if an unauthorized individual attempts to make a copy of the protected software, the software will be rendered either entirely or partially useless.

Prior art methods of software protection have also included the licensing of each authorized copy of the software to a particular machine or device. Then, the software is written so as to first execute a subroutine during normal operation which identifies the machine on which the software is being run and checks to be sure that the software is licensed on that machine. If it is determined that the machine which is being used is not an authorized machine, the software will not operate. Typically, the software then causes a message to be displayed on the terminal screen or printer which instructs the user to contact the software developer. This type of a protection device may also provide for the disassembling or scrambling of the software as set forth above.

While the foregoing prior art software protection methods have helped reduce the amount of unauthorized copying and distribution of computer software, these protection methods have proven inadequate in a number of ways. First, many programmers have become quite good at breaking through these prior art protection schemes in order to secure copies of the software. For example, an experienced programmer may be able to manipulate the software so as to override or remove the protection code or subroutine and thereby permit the software to be copied. In addition, once the prior art software protection methods have been disabled, the software can be copied in its entirety from the storage medium and is, thus, immediately available for distribution to and use by others.

Accordingly, it would be an improvement in the art to provide a system and method for protecting computer software which does not allow a complete copy of the software to be readily obtained. It would also be an improvement in the art to provide a system and method for computer software protection wherein copied software could not be readily used on another computer system. Such a system and method is disclosed and claimed herein.

BRIEF SUMMARY AND OBJECTS OF THE INVENTION

The present invention is directed to a novel system and method for computer software protection. The system comprises a random access memory device (RAM) and one or more read-only memory devices (ROMs). The memory locations of each of the ROMs are identified using the same set of addresses; and such a set of addresses may also correspond to a portion of the memory locations of the RAM. The system futher comprises a memory control circuit, which determines whether the RAM or one of the ROMs is to be accessed, and a ROM select circuit, which determines which one of the ROMs is to be accessed.

In use, selected portions or subroutines of the computer software are first stored in the ROMs. The remaining portions of the computer software are coded so as to call for such selected portions or subroutines in proper sequence; and such remaining portions of the software are then stored on a suitable, external storage medium. Then, when the computer software is to be used, such remaining portions of the software are loaded into the RAM from the external storage medium in conventional fashion; and the computer software stored in the RAM is then read and executed in the usual manner. At some point in the processing, an instruction is received which indicates that a particular ROM is to be accessed next in order to access one of the selected software portions or subroutines. The software then accesses a specific memory address corresponding to a memory location of the ROMs; and, depending upon which ROM was previously indicated to be accessed, the software portion or subroutine in the appropriate ROM at the specified address is thereafter accessed and used.

It is, therefore, a primary object of the present invention to provide a system and method for protecting computer software.

It is also an object of the present invention to provide a computer software protection system and method which does not permit a complete copy of the software to be readily obtained.

In addition, it is an object of the present invention to provide a computer software protection system and method which makes it difficult to use copied computer software on a computer system which has a different hardware configuration.

These and other objects and featues of the present invention will become more fully apparent from the following description and appended claims, taken in conjunction with the accompanying drawings.

DETAILED DESCRIPTION OF THE PREFERRED EMBODIMENT

Figure 2:
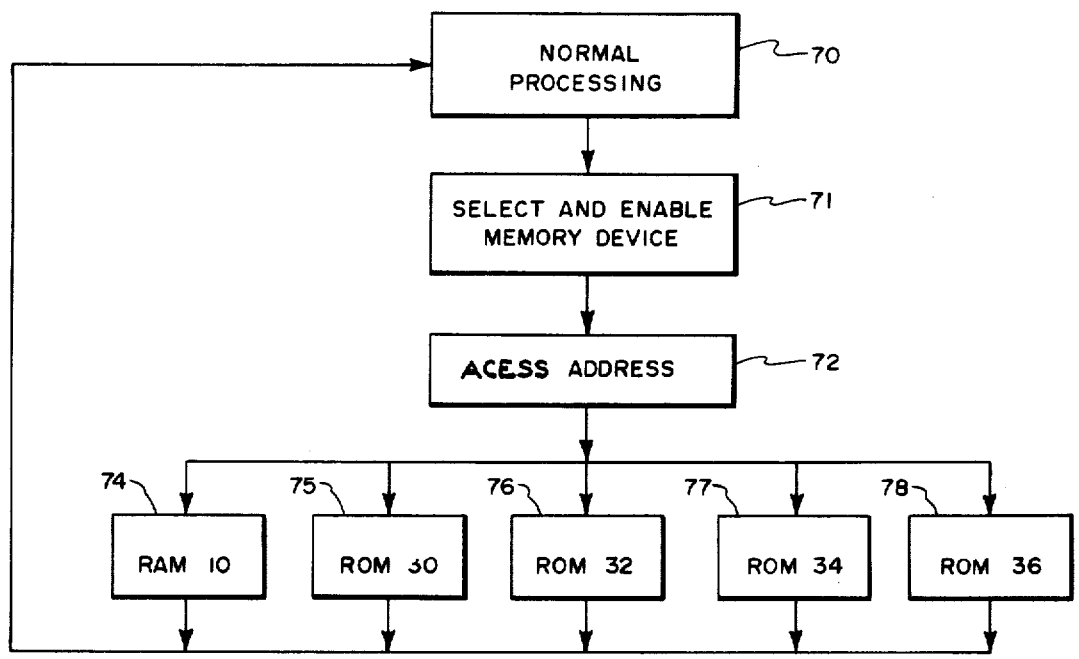
FIG. 2 is a functional flow chart illustrating the operation of the computer software protection system of FIG. 1.
Figure 3:
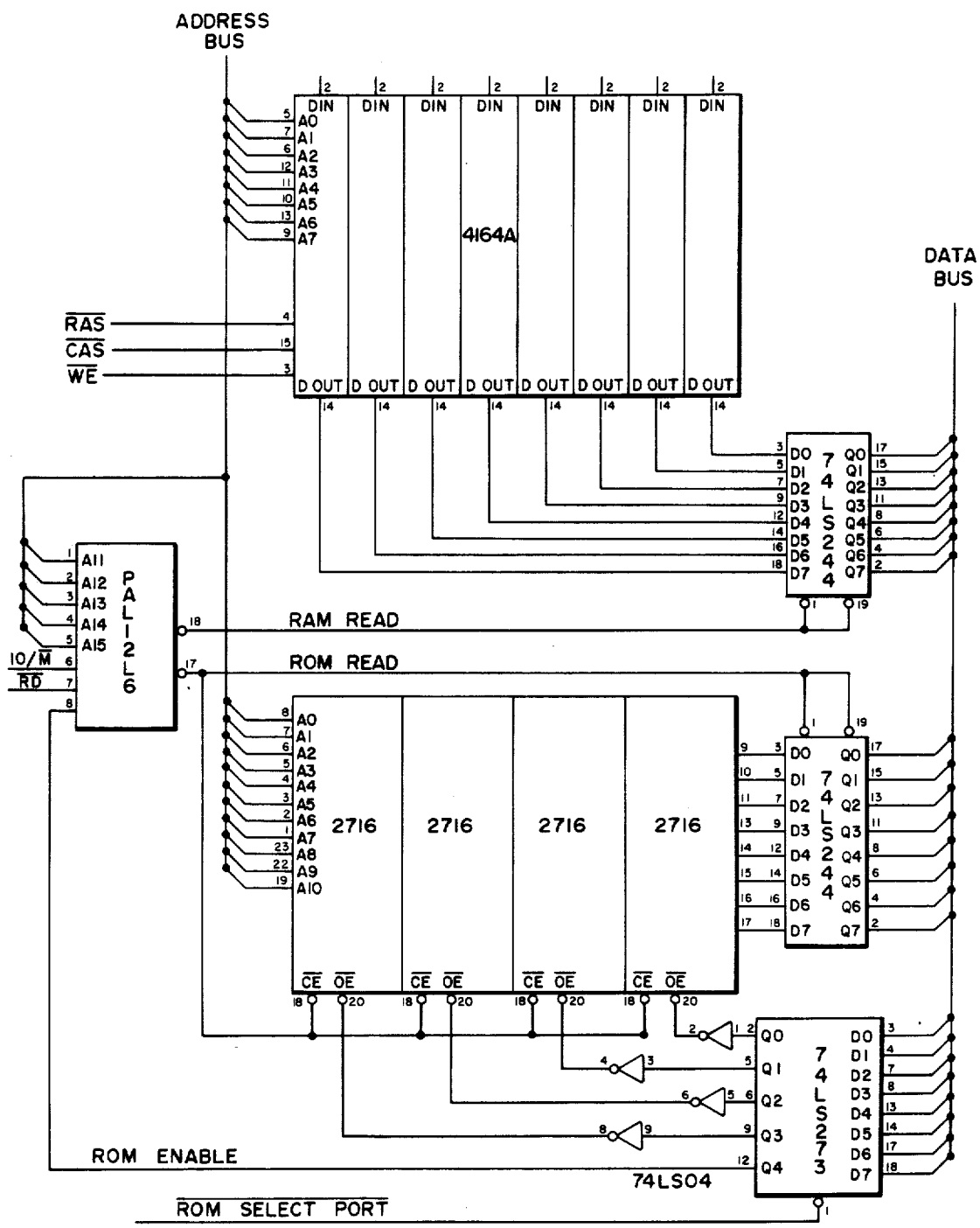
FIG. 3 is a schematic diagram illustrating one specific way in which the software protection system of the present invention can be configured.

It will be readily appreciated that the components of the present invention, as generally described and illustrated in the figures herein, could be arranged and designed in a wide variety of different configurations. Thus, the following more detailed description of the embodiment of the system and method of the present invention, as represented in FIGS. 1 through 3, is not intended to limit the scope of the invention, as claimed, but it is merely representative of one presently preferred embodiment of the invention.

Figure 1:
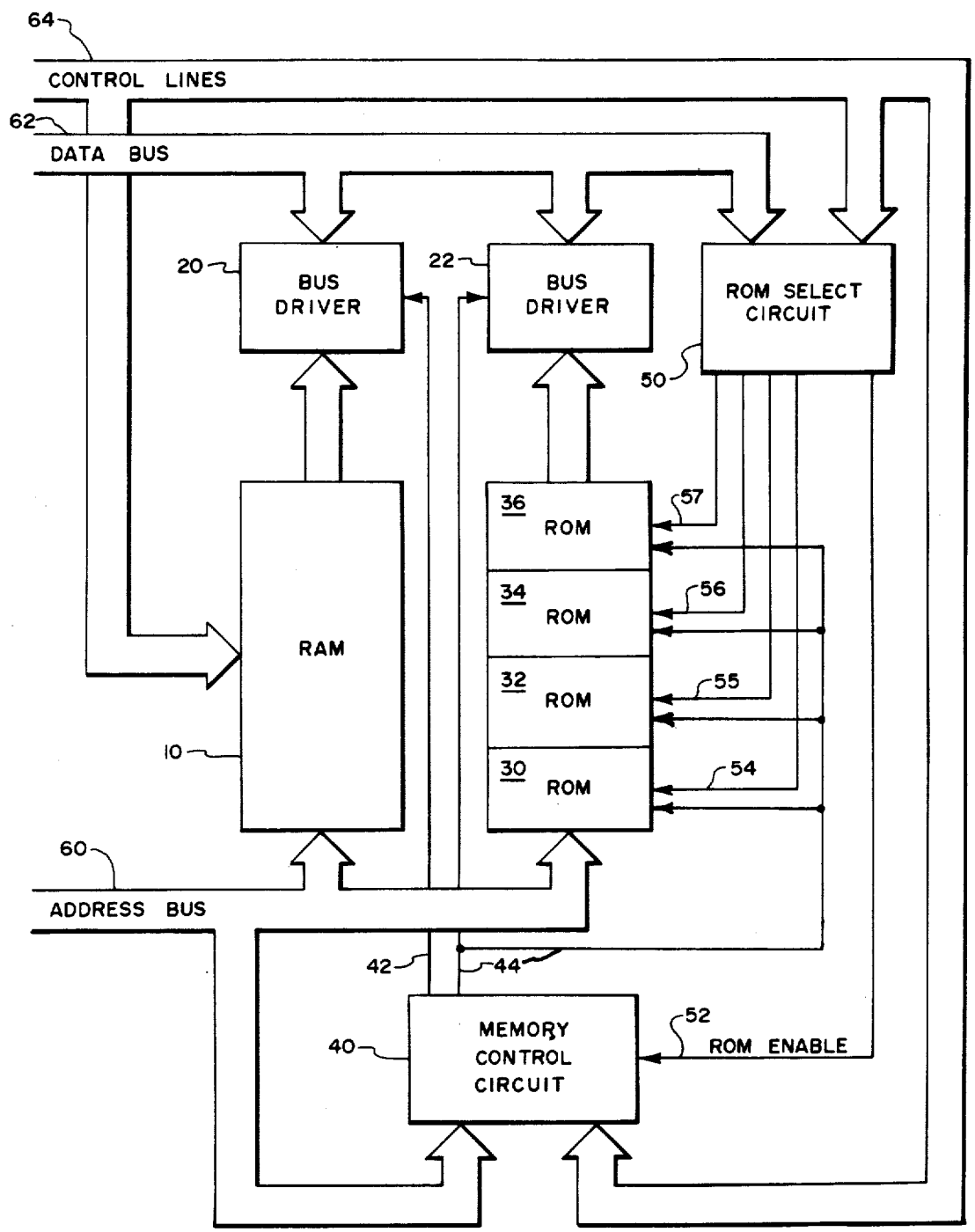
FIG. 1 is a general block diagram illustrating one presently preferred embodiment of the computer software protection system of the present invention.

One presently preferred embodiment of the computer software protection system of the present invention is illustrated in FIG. 1. As shown, the software protection system comprises a random access memory device (RAM) 10 with a corresponding bus driver 20. In addition, the system comprises one or more read-only memory devices (ROMs). While virtually any numer of ROMs may be employed in this system, the software protection system of the present invention is illustrated herein as comprising four ROMs 30, 32, 34, and 36, with a corresponding bus driver 22. In addition, the software protection system of the present invention comprises a memory control circuit 40 and a ROM select circuit 50.

As illustrated in FIG. 1, an address bus 60 is connected to RAM 10, to ROMs 30, 32, 34, and 36, and to memory control circuit 40. Significantly, the memory locations of each of ROMs 30, 32, 34, and 36 are identified by the same set of addresses, and this set of addresses may also advantageously correspond to a portion of RAM 10. The reason for this addressing scheme will become more readily apparent from the discussion which follows.

A data bus 62 is connected both to bus drivers 20 and 22 and to ROM select circuit 50. As set forth more fully below, data bus 62 is used to transmit data and control signals to ROM select circuit 50. In addition, data bus 62 is used to transmit data from bus drivers 20 and 22 to the external circuitry (not shown). Also, as shown in FIG. 1, control lines 64 are provided to ROM select circuit 50, RAM 10, and memory control circuit 40. The function of control lines 64 will be described in more detail below.

During the manufacture of the software protection system of the present invention, selected portions or subroutines (advantageously, some of the more important portions or subroutines) of a computer software to be protected are stored in ROMs 30, 32, 34 and 36. This may be accomplished by any one of a number of techniques which are well known in the art, such as, for example, by using electronically programmable ROMs and by storing such portions or subroutines of the software in the ROMs using suitable electronic signals. Notably, since the memory locations of each of the ROMs are identified by the same set of memory addresses, two or more of the software portions or subroutines may be located at exactly the same memory address, although such portions or subroutines are actually stored in different ROMs. Importantly, such selected portions or subroutines of the software which are stored in the ROMs thus become stored internally within the computer system and effectively become a permanent part of the computer system's internal memory. That is, such portions or subroutines of the software need not be loaded into the computer system each time the software is used; and such portions or subroutines, thus, need not be stored or distributed to computer users on any external storage medium.

The remaining portions of the software are then coded so as to call for the subroutines or portions of the software stored in ROMs 30, 32, 34 and 36 in appropriate sequence. This may be done, for example, by including suitable commands in the software which (1) select a particular ROM on which the needed subroutine is stored and which (2) call the appropriate ROM address at which the subroutine is located. The remaining portions of the software which have been thus coded are then stored on some type of external storage medium, that is, on a storage medium which is external to the computer system. Such external storage medium may comprise virtually any storage medium which is suitable for storing computer software, such as, for example, magnetic tapes, discs or diskettes, or computer punch cards.

After the computer software is coded and stored as set forth above, it is ready to be distributed to computer users. Upon distribution of the software, a computer user is first provided with the hardware configuration which is illustrated in FIG. 1 and which includes the selected portions or subroutines of the software stored on ROMs 30, 32, 24 and 36. This hardware configuration may be provided either by supplying the computer user with a complete computer system which has the required hardware configuration or by appropriately modifying a computer system already owned by such computer user. In addition, the computer user is also provided with a copy of the remaining portions of the computer software on some external storage medium.

To operate the software, the portions of the software which are stored on the external storage medium are first loaded into RAM 10 in a conventional manner. Thereafter, software operation commences and the software instructions in RAM 10 are accessed and executed in a normal fashion. During processing, signals are sent along control lines 64 to indicate whether RAM 10 or, alternatively, the ROMs are to be accessed in order to obtain the next software instruction. If RAM 10 is to be the source of the next instruction, memory control circuit 40 sends a signal along line 42 to enable bus driver 20, such that software instructions from RAM 10 can be driven onto data bus 62, as needed.

If, on the other hand, one of the ROMs is to be accessed in order to receive a next software instruction, ROM select circuit 50 transmits a ROM enable signal along line 52 to memory control circuit 40. In addition, data is transmitted along data bus 62 to ROM select circuit 50 to indicate which of the four ROMs is to be accessed. If ROM 30 is selected to be accessed, for example, a signal would then be sent by ROM select circuit 50 to ROM 30 along line 54, thereby enabling ROM 30 to be accessed. ROMs 32, 34 and 36 may be similarly selected and enabled by transmitting appropriate signals from ROM select circuit 50 along lines 55, 56 and 57, respectively.

Once the RAM or ROMs have been selected as the source of a next instruction as set forth above, a memory address is sent along address bus 60 to RAM 10, to ROMs 30, 32, 34 and 36, and to memory control circuit 40. As set forth above, each of ROMs 30, 32, 34 and 36 have the identical set of addresses associated with their memory locations, and this set of addresses may also correspond to a block of memory in RAM 10. For example, each of the bytes of memory in ROMs 30, 32, 34 and 36 could be identified by the hexidecimal addresses F800 through FFFF; and RAM 10 could also have a block of memory which is identified by addresses F800 to FFFF.

With the memory address having been transmitted along address bus 60, data is ready to be read onto data bus 62. Signals are then sent along control lines 64 to memory control circuit 40 to activate the appropriate bus driver. If, for example, the next software instruction is to be accessed from RAM 10 and the address received was F800, memory control circuit 40 would send an appropriate signal along line 42 to bus driver 20 such that the appropriate instructions may be driven from RAM 10 onto data bus 62.

Alternatively, the same address (e.g., F800) could have been transmitted along address 60 but ROM 30 could have been selected as the source of the instruction. In such case, memory control circuit 40 would first check to be sure that a valid ROM address has been received and, if so, memory control circuit 40 would transmit a signal along line 44 to bus driver 22 and the ROMs so as to allow data from ROM 30 to be driven onto data bus 62. It will be readily appreciated that data could also be accessed from any of ROMs 32, 34 or 36 in a similar manner.

Thus, while the software stored in RAM 10 will at times indicate that the next instruction step is to be found at a particular address, such as, for example, at address F800, the actual content of the instruction may actually come from a numer of different locations. This is illustrated graphically in FIG. 2. As shown, the system first begins operation and undertakes normal processing at step 70 by obtaining successive instructions to be executed from RAM 10. Then, an instruction is reached in RAM 10 which designates that the next programming instruction is stored in a particular ROM memory device or in the RAM 10. The particular ROM or RAM is then selected and enabled at step 71. The system next calls a particular memory address, as illustrated at step 72. However, the actual location of the instruction depends upon which device has been previously selected and enabled. Thus, if RAM 10 has been selected and enabled, the system then reads that address from RAM 10 as illustrated at step 74 and then returns to normal processing at 70. However, if ROM 30 was selected and enabled, ROM 30 is then read at the indicated address as illustrated at step 75 and the system returns to normal processing. Similarly, ROMs 32, 34 or 36 could have been selected and enabled and these devices would then be read as illustrated at steps 76, 77 or 78, respectively, after which the system would return to normal processing.

Hence, in the software protection system of the present invention, the various software instructions are obtained first from RAM 10 and then from one of the ROMs such that the software instructions are read and executed in proper sequence. Thus, once the computer system has been initialized by the operating system, instead of reading all of the software instructions from a single memory device, the software instructions which are thereafter to be executed are read in proper sequence by reading from RAM 10 and the ROMs 30, 32, 34 and 36 in an alternating fashion.

It will be appreciated, therefore, that the computer software protection system of the present invention has the unique advantage that all of the software is not readily available to an individual who may wish to copy the software. As set forth above, only portions of the software are ever stored on an external storage medium. Importantly, key subroutines or other significant portions of the software are stored internally in a number of ROMs. Thus, if an individual was to try to copy the computer software, he would normally obtain only that portion of the software which is stored on the external storage medium. Significantly, such individual would not obtain copies of the portions of the software which are internally stored on the various ROMs. Hence, when an individual thereafter tried to execute the copied software on another computer system which did not have the required ROMs, the software would at times direct the computer system to a particular address which may not have the needed software instruction. For example, the computer system may erroneously read a specified address of the RAM, when the correct software instruction was actually to be obtained at the same address of one of the ROMs.

Reference is next made to FIG. 3, which illustrates in detail one preferred embodiment for a schematic diagram derived from the block diagram of FIG. 1. Those of ordinary skill in the art will, of course, appreciate that various modifications of the detailed schematic diagram of FIG. 3 may be easily made without departing from the essential characteristics of the invention, as described in connection with the block diagram of FIG. 1 above. Thus, the detailed schematic diagram of FIG. 3 is intended only as an example, and simply illustrates one presently preferred embodiment of a schematic diagram that is consistent with the foregoing description of FIG. 1 and the invention as claimed herein.

In FIG. 3, the various circuit components generally correspond to one of the functional blocks of FIG. 1. In particular, RAM 10 comprises eight 4164A integrated circuits (ICs); and ROMs 30, 32, 34 and 36 each comprise a 2716 IC. Further, bus drivers 20 and 22 each comprise a 74LS244 IC driver; memory control circuit 40 comprises a PAL12L6 IC; and ROM select circuit 50 comprises a 74LS273 IC, together with the indicated 74LS04 IC inverters. Finally, control lines 64 of FIG. 1 are illustrated in FIG. 3 as six separate control bits: "$\overline{RAS}$" (row address select); "$\overline{CAS}$" (column address select); "$\overline{WE}$" (write enable); "IO/$\overline{M}$" (input-output/memory); "$\overline{RD}$" (read); and "ROM select port." With the exception of the "ROM select port" control bit, each of the control bits mentioned above are standard control bits used in the computer industry. The "ROM select $\overline{port}$" control bit is a bit generated by conventional port decode circuitry to indicate that one of the 2716 ROMs is to be selected and read.

The equations which are used by the PAL12L6 IC of FIG. 3 are as follows:

$$\overline{RAM\ READ} = \overline{IO/M} \cdot \overline{RD} \cdot \overline{ROM\ ENABLE}$$

$$\overline{ROM\ READ} = \overline{IO/M} \cdot \overline{RD} \cdot ROM\ ENABLE$$

$$\cdot A11 \cdot A12 \cdot A13 \cdot A14 \cdot A15$$

The invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

What is claimed and desired to be secured by U.S. Letters Patent is:

1. In a computer system having first and second electronic memory means which together are used to store a program comprising executable instructions, a method of protecting against unauthorized duplication of selected proprietary portions of said program, the method comprising the steps of:

pre-storing in said first memory means prior to distribution to a system user said selected proprietary portions of said executable program, whereby said selected proprietary portions of said program are not readily susceptible to access and duplication by a system user;

pre-storing prior to distribution to a system user the remaining portion of said executable program on an external storage medium, said external storage medium being available for access and use by system users; and when running said executable program in its entirety on said computer system, said computer system automatically performing the steps of:

(a) loading said remaining portion of the executable program from said external storage medium to said second memory means;

(b) commencing with execution, in turn, of each instruction contained in said second storage means until instructed to transfer to said first storage means;

(c) thereafter executing, in turn, the selected proprietary portions of said program stored in said first memory means;

(d) thereafter returning to said second memory means and continuing with execution of said remaining portions of the program; and (e) repeating steps (a)–(d) until said program is completely executed.

2. A method as defined in claim 1 wherein said step (c) of executing said selected proprietary portions of said program stored in said first memory means comprises the step of commencing execution at an address in said first memory means that also corresponds to an address in said second memory means, and identifying said address as pertaining to said first memory means rather than said second memory means when commencing execution of said selected proprietary portions of said program.

3. A method as defined in claim 1 wherein said first memory means comprises a plurality of read-only memories (ROMs) and wherein said step of pre-storing said selected proprietary portions of said program comprises the step of storing separate parts of said selected portions in each of said ROMs.

4. A method as defined in claim 3 wherein said second memory means comprises a random access memory (RAM) and wherein said step (a) of loading the remaining portion of said program from said external storage medium comprises the step of loading said remaining portion of said program into said RAM.

5. A method as defined in claim 4 wherein said step (c) of executing said selected proprietary portions of said program comprises the steps of:

identifying at least one program instruction stored in each ROM with an address that also corresponds to at least one program instruction stored in said RAM;

identifying said address as pertaining to one of said ROMs when commencing execution of a part of said selected proprietary portions of said program; and commencing execution of said proprietary part of said program at said address identified for said ROM.

6. A computer system for protecting against unauthorized duplication of selected proprietary portions of a computer program adapted for execution on said computer system, said computer system comprising:

a data transfer bus;

a first memory means connected to said data transfer bus for accessing selected proprietary portions of said program which have been pre-stored on said first memory means prior to distribution to system users, whereby said proprietary portions are not readily susceptible to access and duplication by a system user;

an external storage medium on which the remaining portion of said program is pre-stored prior to distribution to system users, said external storage medium being available for access and use by system users;

a second memory means into which said remaining portion of said program is loaded from said external storage medium when it is desired to run said program on said computer system, said second memory means being connected to said data transfer bus in parallel with said first memory means; and means for controlling and selecting said first and second memory means so as to commence executing, in turn, each program instruction stored in said second memory means until instructed to transfer to said first memory means, and thereafter transferring to said first memory means and executing said selected proprietary portions of said program and then returning to said second memory means to complete the execution of said remaining portions of said program.

7. A system as defined in claim 6 wherein said first memory means comprises a plurality of read-only memories (ROMs) and wherein each said ROM is adapted for separately storing separate parts of said proprietary portions of said program.

8. A computer system as defined in claim 7 wherein said second memory means comprises a random access memory (RAM).

9. A computer system as defined in claim 8 wherein said means for controlling said first and second memory means comprises:

an address bus;

a first bus driver for interfacing said RAM to said data transfer bus;

a second bus driver for interfacing said ROMs to said data transfer bus; and said memory control circuit electronically connected to said address bus and electronically connected to said first and second bus drivers, said memory control circuit enabling one of said bus drivers to permit transfer from said RAM to one of said ROMs when executing a part of said proprietary program.

10. A computer system as defined in claim 9 wherein said means for controlling and selecting said first and second memory means comprises a ROM select circuit electronically connected to each said ROM and to said memory control circuit, said ROM select circuit enabling and selecting one of said ROMs so as to permit part of said proprietary program to be transferred to said data transfer bus for execution by said computer system.

* * * * *